United States Patent [19]
Lam et al.

[11] Patent Number: 6,005,634
[45] Date of Patent: Dec. 21, 1999

[54] METHOD AND APPARATUS FOR CONTROLLING THE DISPLAY OF A VIDEO IMAGE

[75] Inventors: Kut Hing Lam, Estate; Kwok Ban Nip, Kowloon, both of The Hong Kong Special Administrative Region of the People's Republic of China; Gerald Lunn, San Jose, Calif.

[73] Assignee: Motorola, Inc., Schaumburg, Ill.

[21] Appl. No.: 08/889,805

[22] Filed: Jul. 8, 1997

[30] Foreign Application Priority Data

Jul. 24, 1996 [SG] Singapore .............................. 9610365

[51] Int. Cl.[6] .............................. H04N 5/12; G09G 1/00
[52] U.S. Cl. .......................... 348/541; 348/521; 348/546; 348/547; 345/213; 345/10; 315/370; 315/398
[58] Field of Search .............................. 345/213, 10, 11; 315/370, 371, 398; 348/521, 524, 540, 541, 546, 547, 548

[56] References Cited

U.S. PATENT DOCUMENTS

| | | | |
|---|---|---|---|
| 4,319,276 | 3/1982 | Cense et al. ............................. | 348/544 |
| 4,351,001 | 9/1982 | McGinn et al. ......................... | 348/541 |
| 4,802,009 | 1/1989 | Hartmeier ............................... | 348/537 |
| 5,117,290 | 5/1992 | Heerkens ................................ | 348/537 |
| 5,121,086 | 6/1992 | Srivastava .............................. | 331/11 |
| 5,179,321 | 1/1993 | Smith et al. ............................ | 315/398 |
| 5,619,276 | 4/1997 | Christopher et al. ................... | 348/541 |
| 5,760,839 | 6/1998 | Sumiyoshi .............................. | 348/541 |

*Primary Examiner*—Edward P. Westin
*Assistant Examiner*—Shane R. Gardner
*Attorney, Agent, or Firm*—Rennie William Dover

[57] ABSTRACT

A control circuit (100) which receives horizontal synchronising pulses (265) and generates a horizontal drive output signal (455) for a cathode ray tube (CRT) display. The horizontal control circuit (100) generates two ramp signals. A first ramp signal (410) for horizontal position adjustment of an image on the CRT display, and a second ramp signal (440) for propagation delay compensation of a deflection circuit (155) coupled to the CRT display. The control circuit (100) also provides digital of control of the duty cycle of the horizontal drive signal (455).

20 Claims, 5 Drawing Sheets

METHOD AND APPARATUS FOR CONTROLLING THE DISPLAY OF A VIDEO IMAGE

FIELD OF THE INVENTION

This invention relates in general to controlling a video display, and in particular to a method and apparatus for controlling the display of a video image.

BACKGROUND OF THE INVENTION

A video monitor receives control signals including vertical and horizontal synchronising signals, and uses these signals to control the display of a video image. In a conventional video monitor a horizontal position control circuit receives the horizontal synchronising signal and uses the horizontal synchronising signal to control the horizontal scanning across the display. In addition, the horizontal position control circuit provides a means of adjusting the horizontal position of the video image.

To control the horizontal scanning, the horizontal position control circuit generates a horizontal drive output signal to a deflection circuit when a horizontal synchronising pulse occurs. However, a deflection circuit has an inherent propagation delay and the propagation delay varies between different deflection circuits. The propagation delay causes a delay between the time the horizontal synchronising pulse occurs and the time the horizontal drive output signal is generated. To overcome the difficulty caused by the propagation delay of the deflection circuit, a known horizontal position control circuit advances the generation of the horizontal drive output to the deflection circuit by a time equal to the propagation delay of the deflection circuit. The known horizontal position control circuit does this by generating a reference ramp signal having a ramp with a duration that is high enough to cover a range of propagation delays, and then using the ramp to generate the horizontal drive output signal.

Conventionally, the reference ramp signal is also used in the horizontal control circuit to provide a range of horizontal position adjustment. This method of dual use of the ramp of the single reference ramp signal is used in the MC13081 integrated circuit manufactured by Motorola Inc. In order to accommodate the requirements of wide propagation delay compensation and horizontal position adjustment, the duration of the ramp of the reference ramp signal can be increased causing the ramp of the single reference signal to have a more gradual slope. However, with a more gradual slope the noise in the horizontal control circuit increases, which results in jitter of the video image on the display.

Hence, there is a need for a horizontal control circuit that can provide a wide range of propagation delay compensation and a range of horizontal position adjustment, without producing a large amount of jitter of the video image.

SUMMARY OF THE INVENTION

Accordingly, in one aspect of the invention, there is provided an apparatus for a control circuit for a cathode ray tube (CRT) display, comprising: an input for receiving a horizontal synchronising signal from a controller; a reference circuit coupled to the input for receiving the horizontal synchronising signal and producing a first reference output signal and a second reference output signal; a first ramp generator coupled to the reference circuit for receiving the first reference output signal and generating a first ramp signal; a first comparator coupled to the first ramp generator for receiving the first ramp signal and comparing with a desired horizontal position signal to produce a flyback reference signal; a phase detector circuit coupled to the first comparator for receiving the flyback reference signal and a current flyback signal from the CRT display and providing an output signal indicative of the phase difference between them; a second ramp generator coupled to the reference circuit for receiving the second reference output signal and generating a second ramp signal; a second comparator coupled to the second ramp generator and the phase detector circuit for receiving the second ramp signal and comparing with the output signal from the phase detector circuit to produce a control signal indicative of a start pulse time; and a horizontal output circuit coupled to the second comparator for receiving the control signal and providing a horizontal drive signal for the CRT display.

BRIEF DESCRIPTION OF THE DRAWINGS

One embodiment of a control circuit according to the invention will now be more fully described, by way of example, with reference to the drawings, of which.

DETAILED DESCRIPTION OF THE DRAWINGS

Figure 1:
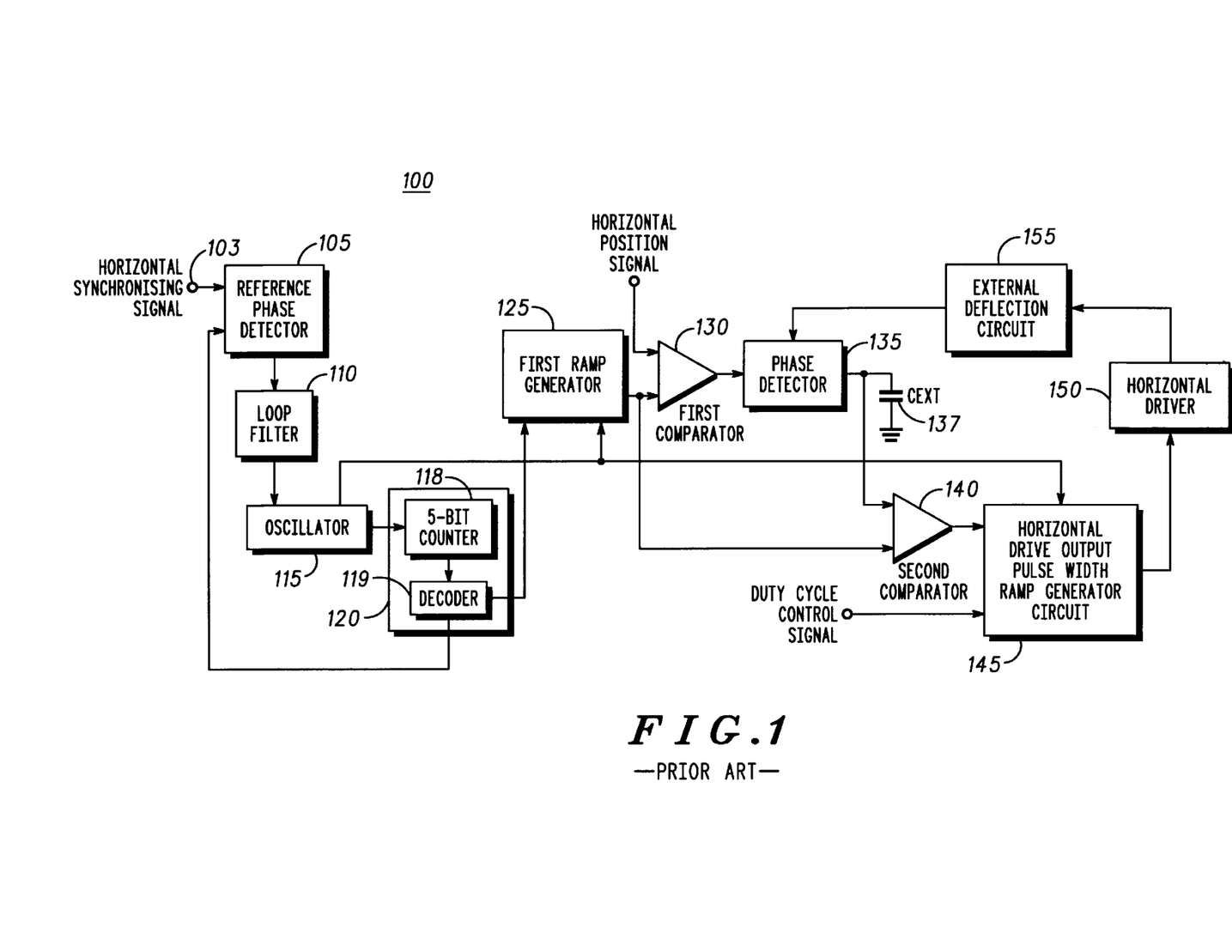
FIG. 1 illustrates a functional block diagram of a known horizontal position control loop.
Figure 2:
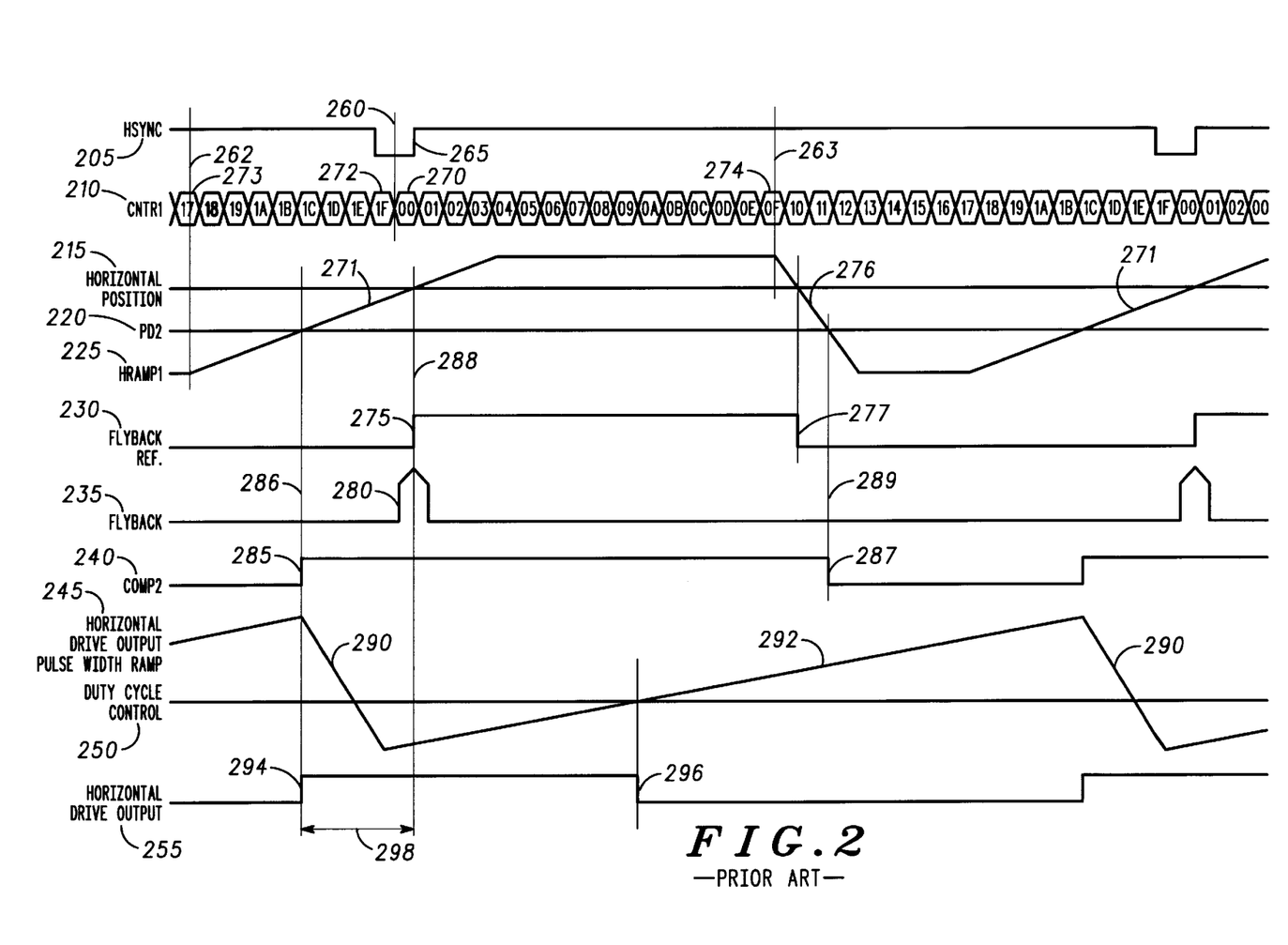
FIG. 2 illustrates a timing diagram of the horizontal position control loop of FIG. 1.

Referring to FIGS. 1 and 2, a reference phase detector 105 has a first input which is coupled to an input 103 to receive a horizontal synchronising signal (HSYNC) 205 from a controller (not shown). A second input of the reference phase detector 105 is coupled to receive a roll over signal from a first output of a 5-bit counter-decoder 120. The reference phase detector 105 provides an output signal indicative of the phase difference between the horizontal synchronising signal (HSYNC) 205 and the roll over signal to an input of a loop filter 110.

The reference phase detector 105 is a comparator which is enabled by a horizontal synchronising pulse 265 of the horizontal synchronising signal (HSYNC) 205 to charge or discharge the loop filter 110. When the horizontal synchronising signal (HSYNC) 205 is a logic 1, no current is sunk from or sourced to the input of the loop filter 110 by the reference phase detector 115. When the roll over signal from the first input of the 5-bit counter-decoder 120 is a logic 1 and the horizontal synchronising signal (HSYNC) 205 is a logic 0 i.e. when the horizontal synchronising pulse 265 occurs, current is sunk to the output of the reference phase detector 105 from the input of the loop filter 110. When the roll over signal from the first output of the 5-bit counter-decoder 120 is a logic 0, and the horizontal synchronising signal (HSYNC) 205 is a logic 0 i.e. when a horizontal synchronising pulse 265 does occur, current is sourced from the output of the reference phase detector 105 to the input of the loop filter 110.

When the phase locked loop formed by the reference phase detector 105, the loop filter 110, the oscillator 115 and the 5-bit counter-decoder 120, is in a locked condition, the rising edge of the roll over signal from the first output of the 5-bit counter-decoder 120, which is the most significant bit of the 5-bit counter-decoder 120, is aligned with the centre of the horizontal synchronising pulse 265 of the horizontal synchronising signal (HSYNC) 205. This is indicated by the reference designator 260 in the drawings. In addition, in the locked condition the charging and discharging time of the loop filter 110 are equal. The loop filter 110 includes a 2.7K resistor, a 1 uF capacitor and a 10 nF capacitor.

The loop filter 110 has an output coupled to provide a filtered output signal voltage to an input of an oscillator 115. The oscillator 115 is a voltage controlled oscillator which has an input coupled to receive the filtered output signal from the output of the loop filter 110, and has an output to provide a square pulse output signal (CLK). The frequency of the square pulse output signal (CLK) is inversely proportional to the filtered output voltage of the loop filter 110. The output of the oscillator 115 is coupled to provide the square pulse output signal (CLK) to an input of the 5-bit counter-decoder 120. In addition, another output of the oscillator 115 is coupled to provide a reference signal (IREF) to a first ramp generator 125 and to a horizontal drive output pulse width ramp generator circuit 145. The reference signal (IREF) provides a single reference which ensures synchronisation between these three circuits.

The 5-bit counter-decoder 120 is a synchronous 5-bit up counter 118 and a decoder 119. The 5-bit up counter 118 is a roll over counter which is coupled to receive the pulses of the square pulse output signal (CLK) from the output of the oscillator 115. The 5-bit up counter 118 counts the pulses of the square pulse output signal (CLK) and maintains a current count value (CNTR1) 210 of the number of pulses of the square pulse output signal (CLK) that are counted. The current count value (CNTR1) 210 of the 5-bit up counter 118 ranges from 00(hex) 270 to 1F(hex) 272 after which the 5-bit up counter 118 rolls over to 00(hex) 270, and repeats the count sequence.

The decoder 119 has an input is coupled to an output of the 5-bit up counter 118. The decoder 119 has a first output coupled to provide the rollover signal via the first output of the 5-bit counter decoder 120 to the second input of the reference phase detector 105. The decoder 119 has a second output coupled to an input of the first ramp generator 125. The decoder 119 functions as a first digital comparator to provide a first reference output signal from the second output to the first ramp generator 125. The first reference output signal is a square pulse signal (H1PULSE). When the first ramp generator 125 receives the square pulse signal (H1PULSE), the first ramp generator generates a first ramp output signal (HRAMP1) 225 having a ramp 271. The square pulse signal (H1PULSE) has a start time 262 and a stop time 263 determined by predetermined count values of the 5-bit up counter 118. Hence, by selecting lower predetermined count values the generation of the ramp 271 of the first ramp output signal (HRAMP1) 225 by the first ramp generator 125, can be advanced can be advanced i.e. made to occur earlier in time.

Alternatively, by selecting higher predetermined count values the generation of the ramp 271 can be retarded i.e. made to occur later in time. When the predetermined count value is 17(hex), and the current count value (CNTR1) 210 counted by the 5-bit up counter 118 is 17(hex) 273, indicating the start time 262, the square pulse signal (H1PULSE) changes state from a logic 0 to a logic 1. In addition, when the current count value (CNTR1) 210 counted by the 5-bit up counter 118 is 0F(hex) 274 indicating the stop time 263, the square pulse signal (H1PULSE) changes state from a logic 1 to a logic 0. The selection of the start time 262 and stop time 263 of the square pulse signal (H1PULSE) may be dependent on design considerations such as the input drive requirements of the first ramp generator 125. In another embodiment, the selection of the start time 262 and stop time 263 may be programmable variables and can therefore be dynamically set and stored.

The first ramp generator 125 has an input which is coupled to receive the square pulse signal (H1PULSE) from the second output of the decoder 119, and an output which is coupled to a first input of the first comparator 130. When the square pulse signal (H1PULSE) is a logic 1, a capacitor in the first ramp generator 125 is charged by a current source, in the first ramp generator 125, to generate the ramp 271. And, when the square pulse signal (H1PULSE) is a logic 0, the capacitor in the first ramp generator 125 is discharged by another current source in the first ramp generator 125, to generate a ramp 276. A clamping circuit is implemented in the first ramp generator 125 to limit the voltage of the first ramp output signal (HRAMP1) 225 between 1 volt and 6 volts. The ramp 271 of the first ramp output signal (HRAMP1) 225 spans a time range or duration which must accommodate both the propagation delay compensation range of a deflection circuit 155, and a horizontal position adjustment range of a video image on a video display unit to which the deflection circuit is coupled.

The first input of the first comparator 130 is coupled to the output of the first ramp generator 125 to receive the first ramp output signal (HRAMP1) 225. A second input of the first comparator 130 is coupled to receive a desired horizontal position signal (HORIZONTAL POSITION) 215 from an external source (not shown), and the output of the first comparator 130 is coupled to a first input of the phase detector 135. The desired horizontal position signal (HORIZONTAL POSITION) 215 is a direct current (DC) voltage level that determines the horizontal position of an image on a display. The first comparator 130 compares the voltage of the ramp 271 of the first ramp output signal (HRAMP1) 225 and the voltage of the desired horizontal position signal (HORIZONTAL POSITION) 215, and generates a flyback reference signal (FLYBACK REF) 230.

The flyback reference signal (FLYBACK REF) 230 is a logic 1 when the voltage of the ramp 271 of the first ramp output signal (HRAMP1) 220 is greater than the voltage of the desired horizontal position signal (HORIZONTAL POSITION) 215. The flyback reference signal (FLYBACK REF) 230 is a logic 0 when the voltage of the ramp 271 of the first ramp output signal (HRAMP1) 220 is less than the voltage of the desired horizontal position signal (HORIZONTAL POSITION) 215. Thus, by varying the direct current (DC) voltage level of the desired horizontal position signal (HORIZONTAL POSITION) 215, the rising edge 275 of the flyback reference signal (FLYBACK REF) 230 can be made to occur earlier or later.

As will be described later, the rising edge 275 of the flyback reference signal (FLYBACK REF) 230 sets the start time of a horizontal scan of a video image on a video display, which in turn determines the horizontal position of the video image on the video display. Note that at the stop time 263, the square pulse signal (H1PULSE) changes from a logic 1 to a logic 0, and consequently the capacitor in the first ramp generator 125 is discharged by the current source and the output of the first ramp generator 125 forms a discharge ramp 276. When the voltage of the discharge ramp 276 is lower than the voltage of the desired horizontal position signal (HORIZONTAL POSITION) 215, the flyback reference signal (FLYBACK REF) 230 changes from a logic 1 to a logic 0, forming the falling edge 277.

The phase detector 135, a second comparator 140, the horizontal drive output pulse width ramp generator circuit 145, a horizontal driver 150, and the external deflection circuit 155, are coupled to form another phase locked loop. The phase detector 135 is a comparator which has the first input coupled to the output of the first comparator 130 to receive the flyback reference signal (FLYBACK REF) 230, and has a second input coupled to the external deflection circuit 155 to receive a current flyback signal (FLYBACK) 235.

The phase detector 135 provides an output signal to an external filter (Cext) 137 which in turn provides an output voltage signal (PD2) 220. The voltage level of the output voltage signal (PD2) 220 is indicative of the phase difference between a current flyback pulse 280 of the current flyback signal (FLYBACK) 235 and rising edge 275 of the flyback reference signal (FLYBACK REF) 230. The phase detector 135 is enabled by the current flyback signal (FLYBACK) 235 to charge or discharge the external filter (Cext) 137 to generate the output voltage signal (PD2) 220. When the current flyback signal (FLYBACK) 235 is a logic 0, no current is sunk from, or sourced to, the external filter (Cext) 137. When the flyback reference signal (FLYBACK REF) 230 is a logic 1 and the current flyback signal (FLYBACK) 235 is a logic 1, current is sunk from the external filter (Cext) 137. When the flyback reference signal (FLYBACK REF) 230 is a logic 0 and the current flyback signal (FLYBACK) 235 is a logic 1, current is sourced to the external filter (Cext) 137.

When the phase locked loop made up of the phase detector 135, the second comparator 140, the horizontal drive output pulse width ramp generator circuit 145, the horizontal driver 150, and the external deflection circuit 155, is in locked condition, the rising edge 275 of the flyback reference signal (FLYBACK REF) 230 is aligned with the centre of the flyback pulse 280 of the current flyback signal (FLYBACK) 235, and the charging and discharging time of the external filter (Cext) 137 are equal.

The second comparator 140 has a first input coupled to the external filter (Cext) 137, and has a second input coupled to the output of the first ramp generator 125 to receive the first ramp output signal (HRAMP1) 225. The second comparator 140 compares the voltage of the ramp 271 of the first ramp output signal (HRAMP1) 225, and the voltage level of the output voltage signal (PD2) 220 of the external filter (Cext) 137, and generates a logic output signal (COMP2) 240.

The logic output signal (COMP2) 240 is a control signal indicative of a start pulse time 286 and a stop pulse time 289 for a horizontal drive output signal (HORIZONTAL DRIVE OUTPUT) 255 to to the external deflection circuit 155 via the horizontal drive output pulse width ramp generator circuit 145, and the horizontal driver 150. The logic output signal (COMP2) 240 changes from a logic 0 to a logic 1 forming a rising edge 285 at the start pulse time 286. The stop pulse time is when the voltage of the ramp 271 of the first ramp output signal (HRAMP1) 225 is greater than the voltage level of the output voltage signal (PD2) 220. The logic output signal (COMP2) 240 changes from a logic 1 to a logic 0 forming a falling edge 287 at the stop pulse time 289. The stop pulse time is when the voltage of the ramp 276 of the first ramp output signal (HRAMP1) 225 is less than the voltage level of the output voltage signal (PD2) 220.

The horizontal drive output pulse width ramp generator circuit 145 has a first input coupled to the output of the second comparator 140 to receive the logic output signal (COMP2) 240, a second input coupled to receive a duty cycle control signal (DUTY CYCLE CONTROL) 250 from an external source (not shown), and an output. The duty cycle control signal (DUTY CYCLE CONTROL) 250 is a direct current (DC) voltage level that determines the duty cycle of the output signal of the horizontal drive output pulse width ramp generator circuit 145. The horizontal drive output pulse width ramp generator circuit 145 comprises a D-type bistable, two current sources, a voltage reference and a capacitor. The rising edge 285 of the logic output signal (COMP2) 240 clocks and sets the D-type bistable which enables the first current source to discharge the capacitor. The discharge of the voltage on the capacitor forms a discharging ramp 290. When the voltage on the capacitor is less than the reference voltage provided by the voltage reference, i.e. 1 volt, the D-type bistable is reset to enable the second current source to charge the capacitor. The charging voltage on the capacitor forms a charging ramp 292.

The voltage of the charging ramp 292 is then compared with the voltage level of the duty cycle control signal (DUTY CYCLE CONTROL) 250 to provide a logic output. The logic output is coupled to a first input of a NAND gate and the output of the D-type bistable is coupled to a second input of the NAND gate. The NAND gate provides an output signal to the horizontal driver 150. Hence, when the logic output signal (COMP2) 240 clocks and sets the D-type bistable i.e. it changes from a logic 0 to a logic 1, the output signal of the horizontal drive output pulse width ramp generator circuit 145 changes from a logic 0 to a logic 1. And, when the voltage of the charging ramp 292 is greater than the voltage level of the duty cycle control signal (DUTY CYCLE CONTROL) 250 and the logic output signal (COMP2) 240 is a logic 1, the output signal of the horizontal drive output pulse width ramp generator circuit 145 changes from a logic 1 to a logic 0. In this way the analogue direct current (DC) level of the duty cycle control signal (DUTY CYCLE CONTROL) 250 determines the duty cycle of the output signal of the horizontal drive output pulse width ramp generator circuit 145 to the horizontal driver 150.

The horizontal driver 150 is coupled to the output of the horizontal drive output pulse width ramp generator circuit 145 and the external deflection circuit 155. The horizontal driver 150 buffers the output signal from the horizontal drive output pulse width ramp generator circuit 145 to drive an open collector transistor that provides the horizontal drive output signal (HORIZONTAL DRIVE OUTPUT) 255 to the external deflection circuit 155. The duty cycle of the horizontal drive output signal (HORIZONTAL DRIVE OUTPUT) 255 is controlled by the duty cycle of the output signal of the horizontal drive output pulse width ramp generator circuit 145. Consequently, horizontal drive output signal (HORIZONTAL DRIVE OUTPUT) 255 has a rising edge 294 determined by the rising edge 285 and a falling edge 296 determined by the duty cycle control signal (DUTY CYCLE CONTROL) 250.

The external deflection circuit 155 monitors the rising edge 294 of the horizontal drive output signal (HORIZONTAL DRIVE OUTPUT) 255. When the rising edge 294 of the horizontal drive output signal (HORIZONTAL DRIVE OUTPUT) 255 occurs, the external deflection circuit 155 causes a horizontal scan across the display and generates the flyback pulse 280 of the current flyback signal (FLYBACK) 235. The duration between the rising edge 294 of the horizontal drive output signal (HORIZONTAL DRIVE OUTPUT) 255 and the flyback pulse 280 of the current flyback signal (FLYBACK) 235 is the inherent propagation delay 298 of the external deflection circuit 155.

The operation of the phase locked loop comprising the phase detector 135, the second comparator 140, the horizontal drive output pulse width ramp generator circuit 145, the horizontal driver 150, and the external deflection circuit 155, is such that, the higher the phase error i.e. the difference in time between the occurrence of the flyback pulse 280 of the current flyback signal (FLYBACK) 235 and the rising edge 275 of the flyback reference signal (FLYBACK REF) 230, the more advanced the rising edge 285 of the logic output signal (COMP2) 240 will be relative to the flyback pulse 280 of the current flyback signal (FLYBACK) 235. Consequently, when the phase locked loop is in a locked condition, the rising edge 285 of the logic output signal (COMP2) 240 will occur before the flyback pulse 280 of the current flyback signal (FLYBACK) 235 by a duration equal to the propagation delay 298 of the external deflection circuit 155.

Different deflection circuits need a horizontal drive output signal (HORIZONTAL DRIVE OUTPUT) 255 having different duty cycles in order to optimise their performance. Hence, there is a need to be able to vary the duty cycle of the horizontal drive output signal (HORIZONTAL DRIVE OUTPUT) 255 in order to optimally match a variety of different deflection circuits. The duty cycle control signal (DUTY CYCLE CONTROL) 250 is an analogue signal that controls the duty cycle of the horizontal drive output signal (HORIZONTAL DRIVE OUTPUT) 255. However, the dependence on an analogue control signal does not facilitate manufacturing processes of video monitor manufacturers, particularly in automated video monitor manufacturing processes, as an analogue voltage level is subject to variation with changes in operating conditions.

The ramp 271 of the first ramp output signal (HRAMP1) 225 provides a reference upon which both the flyback reference signal (FLYBACK REF) 230 and the logic output signal (COMP2) 240 are derived. Consequently, the duration of the ramp 271 of the first ramp output signal (HRAMP1) 225 has to accommodate a wide range of propagation delay compensation and also a range of horizontal position adjustment. As the voltage range of the ramp 271 is limited to between 1 volt and 6 volts, the ramp 271 will have a gradual slope in order to accommodate the two range requirements of propagation delay compensation and horizontal position adjustment.

However, phase noise in a circuit is inversely proportional to the slope of the ramp 271. Hence, the more gradual i.e. the less steep the slope of the ramp 271, the greater the phase noise in the circuit. To a user of the video display, the phase noise causes display jitter which is undesirable and must therefore be minimised. In addition, there is a need for a better way of setting the duty cycle of the horizontal drive output signal to which is less sensitive to variations in operating conditions.

Thus, the performance of the known single ramp circuit of the prior art in meeting the demands of accommodating a wide range of propagation delay compensation and a range of horizontal adjustment is limited by the severity of display jitter which is tolerable by a user of a video display unit.

Figure 3:
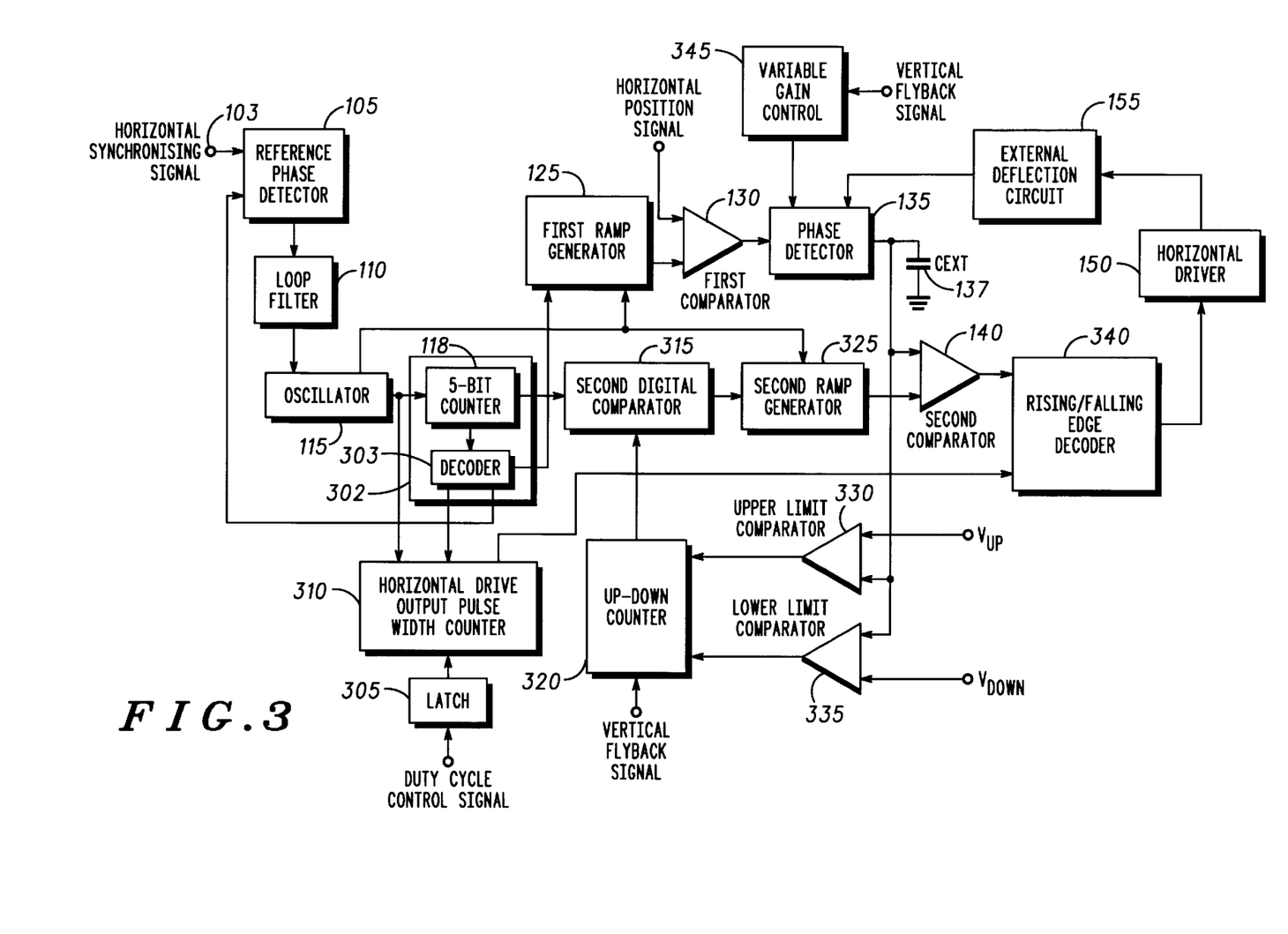
FIG. 3 illustrates a functional block diagram of a control circuit in accordance with a preferred embodiment of the present invention.
Figure 4:
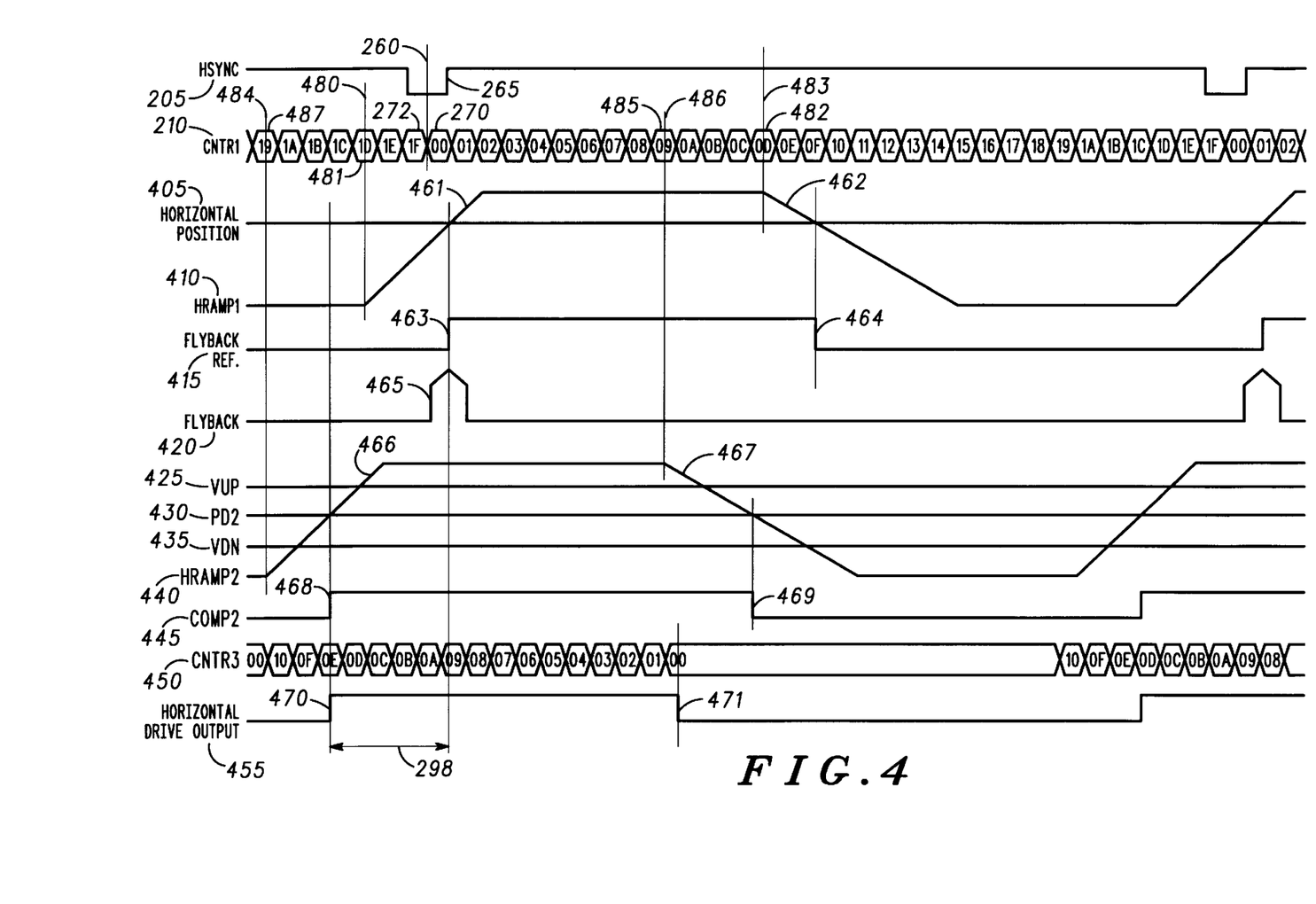
FIG. 4 illustrates a timing diagram of the control circuit of FIG. 3.

FIG. 3 illustrates a preferred embodiment of the present invention of a control circuit 300 for a cathode ray tube (CRT) display. Referring to FIGS. 3 and 4, the phase locked loop formed by the reference phase detector 105, the loop filter 110, the oscillator 115, and a 5-bit counter decoder 302, is similar to the phase locked loop described earlier. In addition, the configuration and the operation of the first ramp generator 125, the first comparator 130 and the phase detector 135 is similar to the configuration and operation as described earlier.

The oscillator 115 is coupled to provide a reference signal (IREF) to the first ramp generator 125 and to a second ramp generator 325 to ensure synchronisation between these three circuits. The 5-bit counter decoder 302 includes the 5-bit up counter 118 and a decoder 303 The decoder 303 provides the roll over signal from a first output to the second input of the reference phase detector 105, and the square pulse signal (H1PULSE) from a second output to the first ramp generator 125. The decoder 303 generates the roll over signal and the square pulse signal (H1PULSE) in the same way as was described for the decoder 119 of the known control circuit 100 described earlier.

When the first ramp generator 125 receives the square pulse signal (H1PULSE), the first ramp generator 125 generates a first ramp output signal (HRAMP1) 410 having a ramp 461. The decoder 303 generates the square pulse signal (H1PULSE) when the current count value (CNTR1) 210 of the 5-bit up counter 118 is equal to a predetermined count value. When the predetermined count value is 1D(hex) and the current count value (CNTR1) 210 counted by the 5-bit up counter 118 is 1D(hex) 481, indicating a start time 480, the square pulse signal (H1PULSE) changes state from a logic 0 to a logic 1.

In addition, when the current count value (CNTR1) 210 is 0D(hex) 482, indicating a stop time 483, the square pulse signal (H1PULSE) changes state from a logic 1 to a logic 0. The first ramp generator 125 has an input which receives the square pulse signal (H1PULSE) from the second output of the decoder 303. When the square pulse signal (H1PULSE) changes from a logic 0 to a logic 1 i.e. at the start time 480, the first ramp generator 125 generates the first ramp output signal (HRAMP1) 410 having the ramp 461.

When the square pulse signal (H1PULSE) changes from a logic 1 to a logic 0 i.e. at the stop time 483, the first ramp generator 125 generates the first ramp output signal (HRAMP1) 410 having a ramp 462. The ramp 461 of the first ramp output signal (HRAMP1) 410 spans a time range or duration which is optimised to provide a horizontal position adjustment range of a video image on a video display to which the deflection circuit 155 is coupled.

The first comparator 130 compares the voltage of the ramp 461 of the first ramp output signal (HRAMP1) 410 and the voltage of a horizontal position signal (HORIZONTAL POSITION) 405 to produce a flyback reference signal (FLYBACK REF) 415 having a rising edge 463 and a falling edge 464. The phase detector 135 receives and compares the flyback reference signal (FLYBACK REF) 415 and a flyback pulse 465 of a current flyback signal (FLYBACK) 420 to provide an output signal to the external filter (Cext) 137 which produces an output voltage signal (PD2) 430.

The voltage level of the output voltage signal (PD2) 430 is indicative of the phase difference between the rising edge 463 of the flyback reference signal (FLYBACK REF) 415 and the flyback pulse 465 of the current flyback signal (FLYBACK) 420. The output voltage signal (PD2) 430 is provided to a first input of the second comparator 140.

In contrast to the decoder 5-bit counter decoder 302 of the known control circuit 100, the 5-bit counter decoder 303 generates additional output signals. These additional output signals include a current count signal from the 5-bit counter 118 via a third output, and a load signal from the decoder 303 via a fourth output. The current count signal indicates the current count value (CNTR1) 210 of the 5-bit up counter 118. The load signal provides an indication to the horizontal drive output pulse width counter 310 to load the contents of a latch 305 into the horizontal drive output pulse width counter 310.

A second digital comparator 315 has a first input coupled to the third output of the decoder 303 to receive the current count signal from the 5-bit up counter 118. The second digital comparator 315 has a second input coupled to receive a selected count signal from an output of an up-down counter 320. The selected count signal indicates a selected count value (CNTR2) of the up-down counter 320.

The second digital comparator 315 compares the current count value (CNTR1) 210 indicated by the current count signal, and the selected count value (CNTR2) indicated by the selected count signal, and provides a second reference output signal from an output to an input of a second ramp generator 325. When the current count value (CNTR1) 210 and the selected count value (CNTR2) are the same, the second digital comparator 315 generates the second reference output signal. The second reference output signal is a square pulse (H2PULSE) that changes from a logic 0 to a logic 1 when the selected count value (CNTR2) is 19(hex) 487 at start time 484. The square pulse (H2PULSE) changes from a logic 1 to a logic 0 when the selected count value (CNTR2) is 09(hex) 485 at stop time 486.

The square pulse signal (H2PULSE) is provided from the output of the second digital comparator 315 to an input of the second ramp generator 325 causing the second ramp generator 325 to generate a second ramp signal (HRAMP2) 440 having a ramp 466. The second ramp generator 325 is similar to the first ramp generator 125, however, a capacitor having a smaller value is used. The second ramp signal (HRAMP2) 440 having the ramp 466 is provided to a second input of the second comparator 140.

The selected count value (CNTR2) determines the time when the second comparator 140 generates the square pulse signal (H2PULSE), which then causes the second ramp generator 315 to generate the ramp 466. Hence, by varying the selected count value (CNTR2) the start of the ramp 466 can be advanced or retarded independently of the start of the ramp 461 of the first ramp output signal (HRAMP1) 410.

The up-down counter 320 is coupled to receive an up input signal, a down input signal and a vertical flyback signal (VERTICAL FLYBACK) from an external source (not shown). The up-down counter 320 comprises a 5-bit counter. The up-down counter 320 counts up when it receives the up input signal (UP), and it counts down when it receives the down input signal (DOWN), thereby determining the selected count value (CNTR2).

When the up input signal (UP) is a logic 1 and the down input signal (DOWN) is a logic 0, the up-down counter 320 will count up i.e. CNTR2=CNTR2+1, when the externally provided vertical flyback signal (VERTICAL FLYBACK) is received. When the up input signal (UP) is a logic 0 and the down input signal (DOWN) is a logic 1, the up-down counter 320 will count down i.e. CNTR2=CNTR2−1, when the vertical flyback signal (VERTICAL FLYBACK) is received. When both the up input signal (UP) and the down input signal (DOWN) are a logic 0, the up-down counter 320 will stop counting i.e. CNTR2=CNTR2, when the vertical flyback signal (VERTICAL FLYBACK) is received.

An upper limit comparator 330 has a first input coupled to the external filter (Cext) 137 to receive the output voltage signal (PD2) 220. A second input of the upper limit comparator 330 is coupled to receive a predetermined upper reference voltage signal (Vup) 425 from an external source (not shown). The upper limit comparator 330 compares the voltage level of the output voltage signal (PD2) 430 and the voltage level of the predetermined upper reference voltage signal (Vup) 425 and produces the up input signal (UP).

When the voltage level of the output voltage signal (PD2) 430 is higher than the voltage level of the predetermined upper reference voltage signal (Vup) 425, the upper limit comparator 330 generates the up input signal (UP) having a logic 1. When the voltage level of the output voltage signal (PD2) 430 is lower than the voltage level of the predetermined upper reference voltage signal (Vup) 425, the upper limit comparator 330 generates the up input signal (UP) having a logic 0.

A lower limit comparator 335 has a first input coupled to the external filter (Cext) 137 to receive the output voltage signal (PD2) 430. A second input of the lower limit comparator 335 is coupled to receive a predetermined lower reference voltage signal (Vdown) 435 from an external source (not shown). The lower limit comparator 335 compares the voltage level of the output voltage signal (PD2) 430 and the voltage level of the predetermined lower reference voltage signal (Vdown) 435, and produces the down input signal (DOWN).

When the voltage level of the output voltage signal (PD2) 430 is lower than the voltage level of the predetermined lower reference voltage signal (Vdown) 435, the lower limit comparator 330 generates the down input signal (DOWN) having a logic 1. When the voltage level of the output voltage signal (PD2) 220 is higher than the voltage level of the predetermined lower reference voltage signal (Vdown) 425, the lower limit comparator 330 generates the down input signal (DOWN) having a logic 0.

The second comparator 140 compares the output voltage signal (PD2) 430 which is provided to the first input of the second comparator 140, and the second ramp signal 440 (HRAMP2) having the ramp 466 which is provided to the second input of the second comparator 140. The second comparator 140 has an output which is coupled to a rising/falling edge decoder 340. The second comparator 140 generates a logic output signal (COMP2) 445 which has a rising edge 468 and a falling edge 469.

The second comparator 140 generates the rising edge 468 when the voltage of the second ramp signal 440 (HRAMP2) is greater than the output voltage signal (PD2) 430. The second comparator 140 generates the falling edge 469 when the voltage of the second ramp signal 440 (HRAMP2) is less than the voltage level of the output voltage signal (PD2) 430.

The rising-falling edge decoder 340 is a logic gate that is coupled to receive the logic output signal (COMP2) 445 from an output of the second comparator 140, and a pulse width signal (HWOUTPUT) from an output of the horizontal drive output pulse width counter 310. The rising-falling edge decoder 340 generates an output logic pulse signal (HDRIVE) having a logic output pulse.

The rising edge of the logic output pulse of the output logic pulse signal (HDRIVE) is aligned with a rising edge 468 of the logic output signal (COMP2) 445. The falling edge of the logic output pulse of the output logic pulse signal (HDRIVE) is determined by the falling edge of the pulse width signal (HWOUTPUT) from the horizontal drive output pulse width counter 310. Hence, the pulse width signal (HWOUTPUT) from the horizontal drive output pulse width counter 310 determines the duty cycle of the logic output pulse of the output logic pulse signal (HDRIVE).

An input of the horizontal driver 150 is coupled to the output of the rising-falling edge decoder 340 to receive the logic output pulse of the output logic pulse signal (HDRIVE). The horizontal driver 150 provides a horizontal drive output signal (HORIZONTAL DRIVE OUTPUT) 455 to the deflection circuit 150 as was described in the known circuit 100. In response to receiving the horizontal drive output signal (HORIZONTAL DRIVE OUTPUT) 455, the deflection circuit 150 produces the flyback pulse 465 of the flyback signal (FLYBACK) 420.

A latch 305 has an input coupled to receive a duty cycle control signal (DUTY CYCLE CONTROL) from an external source (not shown), and has an output coupled to an input of the horizontal drive output pulse width counter 310. The duty cycle control signal (DUTY CYCLE CONTROL) conveys data to the latch 305, and the data is then stored in the latch 305. The horizontal drive output width counter 310 is coupled to receive a data input signal from the latch 305, the pulses of the square pulse output signal (CLK) from the output of the oscillator 115, and the load signal (LOAD) from the 5-bit counter decoder 302.

The horizontal drive output width counter 310 has an output coupled to an input of the rising/falling edge decoder 340 to provide the pulse width signal (HWOUTPUT). The horizontal drive output width counter 310 is a down counter having a count value (CNTR3) 450. When the horizontal drive output width counter 310 receives the load signal (LOAD) from the fourth output of the 5-bit counter-decoder 302, the horizontal drive output width counter 310 is triggered to read the stored data from the latch 305.

The stored data in the latch 305 is transmitted by the data input signal to the horizontal drive output width counter 310. For example, when the data read from the latch 305 is 10(hex), then the count value (CNTR3) 450 of the horizontal drive output width counter 310 is 10(hex). Clocked by the pulses of the square pulse output signal (CLK), the horizontal drive output width counter 310 counts down from 10(hex) until the count value (CNTR3) is 00(hex) then stops counting.

When the horizontal drive output width counter 310 receives the logic output signal (COMP2) 445 from the second comparator 140 the horizontal drive output width counter 310 starts counting down. At the same time, the horizontal drive output width counter 310 causes the output logic pulse signal (HDRIVE) to change from a logic 0 to a logic 1, which causes the horizontal drive output signal (HORIZONTAL DRIVE OUTPUT) 455 to change from a logic 0 to a logic 1, forming the rising edge 470.

When the horizontal drive output width counter 310 is counting down the pulse width signal (HWOUTPUT) remains set to a logic 1. When the horizontal drive output width counter 310 stops counting the pulse width signal (HWOUTPUT) changes from a logic 1 to a logic 0, causing the horizontal drive output signal (HORIZONTAL DRIVE OUTPUT) 455 to change from a logic 1 to a logic 0, forming the falling edge 471. Thus, in this way the duty cycle of the horizontal drive output signal (HORIZONTAL DRIVE OUTPUT) 455 is digitally set by the data provide from the latch 305.

A variable gain control 345 is a logic switch to turn on and off a current source. When a vertical pulse of the vertical flyback signal (VERTICAL FLYBACK) is received, the current source is enabled to supply more current to the phase detector 135 to increase its gain, thereby improving the lock time of the phase detector 135.

Figure 5:
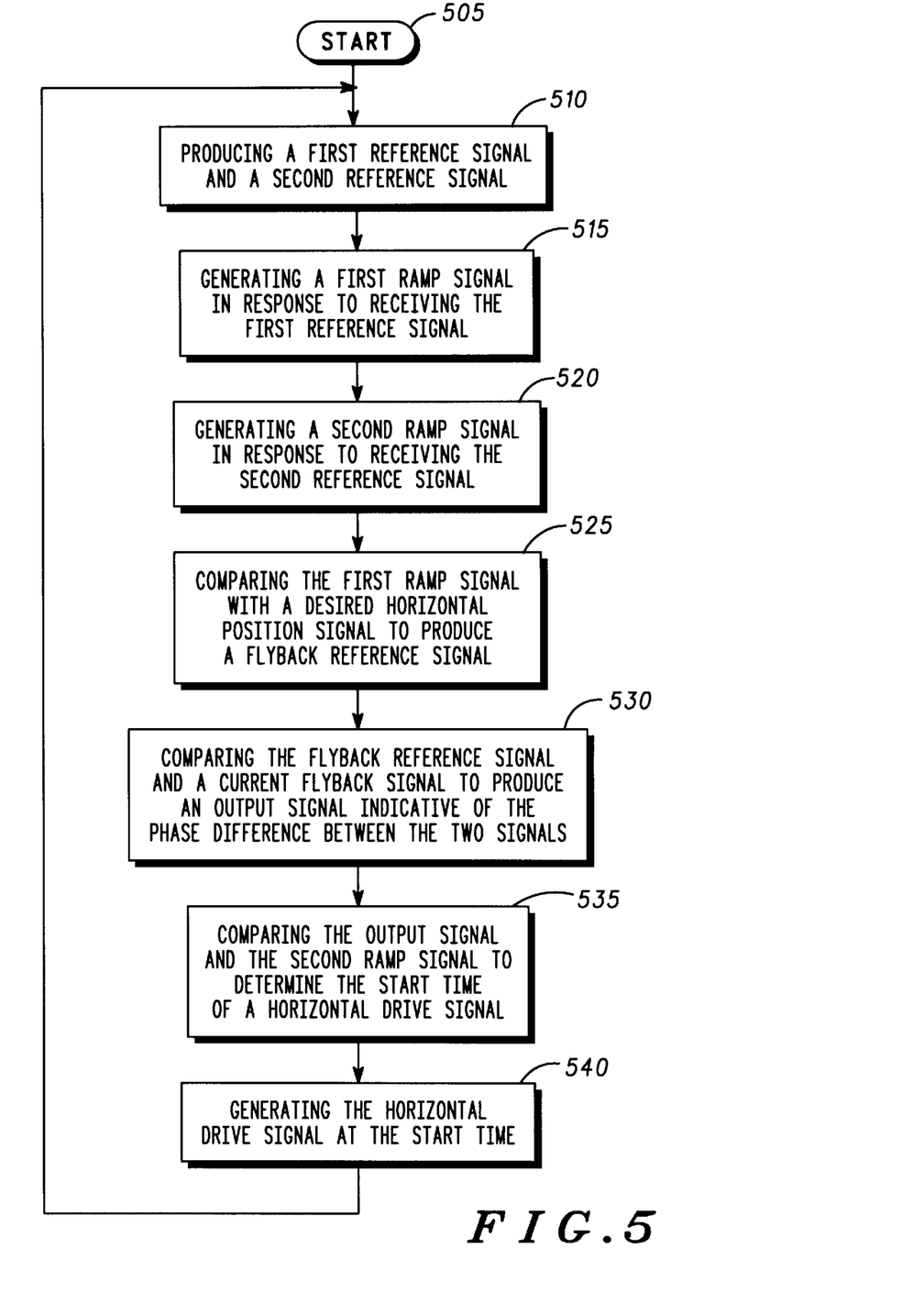
FIG. 5 illustrates a flowchart detailing the operation of the control circuit of FIG. 3.

As shown in FIG. 5, the operation of the horizontal control circuit 100 includes a number of steps. In step 505 the operation is started and the horizontal control circuit 100 is provided with the horizontal synchronising signal (HSYNC) 205. In step 510 the reference circuit comprising the updown counter 320, the upper limit comparator 330, the lower limit comparator 335, the reference phase detector 105, the loop filter 110, the oscillator 115, the 5-bit counter-decoder 120 and a second digital comparator 315, produces the first reference signal (H1PULSE) and the second reference signal (H2PULSE) in response to receiving the horizontal synchronising signal (HSYNC) 205.

In step 515 the first ramp generator 130 generates the first ramp signal (HRAMP1) 410 having the ramp 461 in response to receiving the first reference signal (H1PULSE). In step 520 the second ramp generator 325 generates the second ramp signal (HRAMP2) 440 having the ramp 466 in response to receiving the second reference signal (H2PULSE). In step 525 the first ramp signal (HRAMP1) 410 and the desired horizontal position signal (HORIZONTAL POSITION) is compared by the first comparator 130 to produce the flyback reference signal (FLYBACK REF) 415.

In step 530 the flyback reference signal (FLYBACK REF) 415 and the current flyback signal (FLYBACK) 420 are compared by the phase detector 135 to produce the output signal (PD2) 430 indicating the phase difference between the flyback reference signal (FLYBACK REF) 415 and the current flyback signal (FLYBACK) 420.

In step 535 the output signal (PD2) 430 and the second ramp signal (HRAMP2) 440 are compared by the second comparator 140 which produces the logic output signal (COMP2) 445 indicating the start of the horizontal drive output signal (HORIZONTAL DRIVE OUTPUT) 455. In step 540 the horizontal driver 150 generates the horizontal drive output signal (HORIZONTAL DRIVE OUTPUT) 455 at the start time.

Thus, the horizontal control circuit of the preferred embodiment of the invention utilises two independent ramps. A first ramp is used for adjustment of the horizontal position of the video image, and a second ramp is used to provide a wide range of propagation delay compensation. As the two ramps are independent of each other the slope of each of the ramps can be individually optimised to provide the required range of adjustment and compensation that results in minimum image jitter. In addition, the horizontal control circuit employs a digital means of setting the duty cycle of the external deflection circuit, thereby allowing the process of setting of the duty cycle to be conveniently integrated into an automated video monitor manufacturing process.

Hence, the horizontal control circuit can accommodate a wide range of propagation delay and a range of horizontal position adjustment without producing a large amount of jitter of the video image on the display of a video monitor. In addition, the horizontal control circuit enables digital programming of the duty cycle of the drive signal to an external deflection circuit.

We claim:

1. A control circuit for a cathode ray tube (CRT) display, comprising:
   an input for receiving a horizontal synchronising signal from a controller;
   a reference circuit coupled to the input for receiving the horizontal synchronising signal and producing a first reference output signal and a second reference output signal;
   a first ramp generator coupled to the reference circuit for receiving the first reference output signal and generating a first ramp signal;

a first comparator coupled to the first ramp generator for receiving the first ramp signal and comparing with a desired horizontal position signal to produce a flyback reference signal;

a phase detector coupled to the first comparator for receiving the flyback reference signal and a current flyback signal from the CRT display and providing an output signal indicative of the phase difference between them;

a second ramp generator coupled to the reference circuit for receiving the second reference output signal and generating a second ramp signal;

a second comparator coupled to the second ramp generator and the phase detector circuit for receiving the second ramp signal and comparing with the output signal from the phase detector to produce a control signal indicative of a start pulse time; and a horizontal output circuit coupled to the second comparator for receiving the control signal and providing a horizontal drive signal for the CRT display.

2. A control circuit according to claim 1 wherein the reference circuit comprises:

a reference phase detector coupled to the input for receiving the horizontal synchronising signal and a roll over signal and providing an output signal indicative of the phase difference between them;

a loop filter coupled to the reference phase detector for receiving the output signal from the reference phase detector and providing a filtered output signal;

an oscillator coupled to the loop filter for receiving the filtered output signal and providing an oscillator output signal having a series of pulses at a frequency proportional to the filtered output signal;

a roll over counter coupled to the oscillator for receiving the oscillator output signal and counting the pulses thereof, and providing the roll over signal when the current count reaches a roll over value;

a first digital comparator coupled to the roll over counter for comparing the current count therein with a predetermined count value and providing the first reference output signal when the two counts are the same; and a second digital comparator coupled to the roll over counter for comparing the current count value therein with a selected count and providing the second reference output signal when the two counts are the same.

3. A control circuit according to claim 2 wherein the reference circuit further comprises:

a count selector coupled to the phase detector and the second digital comparator for receiving the output signal of the phase detector, and comparing with a predetermined upper limit signal and a predetermined lower limit signal to provide the selected count having a first count value when the output signal of the phase detector is above the upper limit signal, providing the selected count having a second count value when the output signal of the phase detector is below the lower limit signal, and providing the selected count having a third count value when the output signal of the phase detector is between the upper and lower limit signals.

4. A control circuit according to claim 3 wherein the count selector further comprises:

an upper limit comparator coupled to the phase detector for receiving the output signal of the phase detector and comparing with the predetermined upper limit signal and providing an up signal if the output signal of the phase detector is above the upper limit signal;

a lower limit comparator coupled to the phase detector for receiving the output signal of the phase detector and comparing with the predetermined lower limit signal and providing a down signal if the output signal of the phase detector is below the lower limit signal; and an up-down counter coupled to the upper limit comparator and the lower limit comparator for receiving the up signal and the down signal and providing the selected count having the first count value when the up signal is received from the upper limit comparator, providing the selected count having the second count value when the down signal is received from the lower limit comparator, and providing the selected count having the third count value when neither the up nor down signals are received.

5. A control circuit according to claim 4, wherein the horizontal output circuit comprises:

a pulse width counter coupled to the roll over counter and the oscillator for receiving a load signal from the roll over counter, the oscillator output signal and a desired duty cycle input, and for providing a pulse width signal indicative of a stop pulse time;

an edge decoder coupled to the second comparator and the pulse width counter for receiving the control signal and the pulse width signal, and producing a drive signal having at least one pulse, wherein the duration of the pulse is dependent on the start pulse time indicated by the control signal and the stop pulse time indicated by the pulse width signal; and a horizontal driver coupled to the edge decoder for receiving the drive signal and producing the horizontal drive signal.

6. A control circuit according to claim 5, wherein the horizontal output circuit further comprises a latch coupled to the pulse width counter for receiving the desired duty cycle input for storage therein, and for providing the desired duty cycle input to the pulse width counter.

7. A control circuit according to claim 3, wherein the horizontal output circuit comprises:

a pulse width counter coupled to the roll over counter and the oscillator for receiving a load signal from the roll over counter, the oscillator output signal and a desired duty cycle input, and for providing a pulse width signal indicative of a stop pulse time;

an edge decoder coupled to the second comparator and the pulse width counter for receiving the control signal and the pulse width signal, and producing a drive signal having at least one pulse, wherein the duration of the pulse is dependent on the start pulse time indicated by the control signal and the stop pulse time indicated by the pulse width signal; and a horizontal driver coupled to the edge decoder for receiving the drive signal and producing the horizontal drive signal.

8. A control circuit according to claim 7, wherein the horizontal output circuit further comprises a latch coupled to the pulse width counter for receiving the desired duty cycle input for storage therein, and for providing the desired duty cycle input to the pulse width counter.

9. A control circuit according to claim 2 wherein the horizontal output circuit comprises:

a pulse width counter coupled to the roll over counter and the oscillator for receiving a load signal from the roll over counter, the oscillator output signal and a desired duty cycle input, and for providing a pulse width signal indicative of a stop pulse time;

an edge decoder coupled to the second comparator and the pulse width counter for receiving the control signal and the pulse width signal, and producing a drive signal having at least one pulse, wherein the duration of the pulse is dependent on the start pulse time indicated by the control signal and the stop pulse time indicated by the pulse width signal; and a horizontal driver coupled to the edge decoder for receiving the drive signal and producing the horizontal drive signal.

10. A control circuit according to claim 9 wherein the horizontal output circuit further comprises a latch coupled to the pulse width counter for receiving the desired duty cycle input for storage therein, and for providing the desired duty cycle input to the pulse width counter.

11. A monitor having a control circuit incorporated therein, the control circuit comprising:

an input for receiving a horizontal synchronising signal from a controller;

a reference circuit coupled to the input for receiving the horizontal synchronising signal and producing a first reference output signal and a second reference output signal;

a first ramp generator coupled to the reference circuit for receiving the first reference output signal and generating a first ramp signal;

a first comparator coupled to the first ramp generator for receiving the first ramp signal and comparing with a desired horizontal position signal to produce a flyback reference signal;

a phase detector coupled to the first comparator for receiving the flyback reference signal and a current flyback signal from a CRT display and providing an output signal indicative of the phase difference between them;

a second ramp generator coupled to the reference circuit for receiving the second reference output signal and generating a second ramp signal;

a second comparator coupled to the second ramp generator and the phase detector circuit for receiving the second ramp signal and comparing with the output signal from the phase detector to produce a control signal indicative of a start pulse time; and a horizontal output circuit coupled to the second comparator for receiving the control signal and providing a horizontal drive signal for the CRT display.

12. The monitor having the control circuit of claim 11, wherein the reference circuit comprises:

a reference phase detector coupled to the input for receiving the horizontal synchronising signal and a roll over signal and providing an output signal indicative of the phase difference between them;

a loop filter coupled to the reference phase detector for receiving the output signal from the reference phase detector and providing a filtered output signal;

an oscillator coupled to the loop filter for receiving the filtered output signal and providing an oscillator output signal having a series of pulses at a frequency proportional to the filtered output signal;

a roll over counter coupled to the oscillator for receiving the oscillator output signal and counting the pulses thereof, and providing the roll over signal when the current count reaches a roll over value;

a first digital comparator coupled to the roll over counter for comparing the current count therein with a predetermined count value and providing the first reference output signal when the two counts are the same; and a second digital comparator coupled to the roll over counter for comparing the current count value therein with a selected count and providing the second reference output signal when the two counts are the same.

13. The monitor having the control circuit of claim 12, wherein the horizontal output circuit comprises:

a pulse width counter coupled to the roll over counter and the oscillator for receiving a load signal from the roll over counter, the oscillator output signal and a desired duty cycle input, and for providing a pulse width signal indicative of a stop pulse time;

an edge decoder coupled to the second comparator and the pulse width counter for receiving the control signal and the pulse width signal, and producing a drive signal having at least one pulse, wherein the duration of the pulse is dependent on the start pulse time indicated by the control signal and the stop pulse time indicated by the pulse width signal; and a horizontal driver coupled to the edge decoder for receiving the drive signal and producing the horizontal drive signal.

14. The monitor having the control circuit of claim 13, wherein the horizontal output circuit further comprises a latch coupled to the pulse width counter for receiving the desired duty cycle input for storage therein, and for providing the desired duty cycle input to the pulse width counter.

15. The monitor having the control circuit of claim 12, wherein the reference circuit further comprises:

a count selector coupled to the phase detector and the second digital comparator for receiving the output signal of the phase detector, and comparing with a predetermined upper limit signal and a predetermined lower limit signal to provide the selected count having a first count value when the output signal of the phase detector is above the upper limit signal, providing the selected count having a second count value when the output signal of the phase detector is below the lower limit signal, and providing the selected count having a third count value when the output signal of the phase detector is between the upper and lower limit signals.

16. The monitor having the control circuit of claim 15, wherein the count selector further comprises:

an upper limit comparator coupled to the phase detector for receiving the output signal of the phase detector and comparing with the predetermined upper limit signal and providing an up signal if the output signal of the phase detector is above the upper limit signal;

a lower limit comparator coupled to the phase detector for receiving the output signal of the phase detector and comparing with the predetermined lower limit signal and providing a down signal if the output signal of the phase detector is below the lower limit signal; and an up-down counter coupled to the upper limit comparator and the lower limit comparator for receiving the up signal and the down signal and providing the selected count having the first count value when the up signal is received from the upper limit comparator, providing the selected count having the second count value when the down signal is received from the lower limit comparator, and providing the selected count having the third count value when neither the up nor down signals are received.

17. The monitor having the control circuit of claim 16, wherein the horizontal output circuit comprises:

a pulse width counter coupled to the roll over counter and the oscillator for receiving a load signal from the roll over counter, the oscillator output signal and a desired duty cycle input, and for providing a pulse width signal indicative of a stop pulse time;

an edge decoder coupled to the second comparator and the pulse width counter for receiving the control signal and the pulse width signal, and producing a drive signal having at least one pulse, wherein the duration of the pulse is dependent on the start pulse time indicated by the control signal and the stop pulse time indicated by the pulse width signal; and a horizontal driver coupled to the edge decoder for receiving the drive signal and producing the horizontal drive signal.

18. The monitor having the control circuit of claim 17, wherein the horizontal output circuit further comprises a latch coupled to the pulse width counter for receiving the desired duty cycle input for storage therein, and for providing the desired duty cycle input to the pulse width counter.

19. The monitor having the control circuit of claim 15, wherein the horizontal output circuit comprises:

a pulse width counter coupled to the roll over counter and the oscillator for receiving a load signal from the roll over counter, the oscillator output signal and a desired duty cycle input, and for providing a pulse width signal indicative of a stop pulse time;

an edge decoder coupled to the second comparator and the pulse width counter for receiving the control signal and the pulse width signal, and producing a drive signal having at least one pulse, wherein the duration of the pulse is dependent on the start pulse time indicated by the control signal and the stop pulse time indicated by the pulse width signal; and a horizontal driver coupled to the edge decoder for receiving the drive signal and producing the horizontal drive signal.

20. The monitor having the control circuit of claim 19, wherein the horizontal output circuit further comprises a latch coupled to the pulse width counter for receiving the desired duty cycle input for storage therein, and for providing the desired duty cycle input to the pulse width counter.

* * * * *